(12) United States Patent
Grundmann et al.

(10) Patent No.: US 10,956,749 B2
(45) Date of Patent: *Mar. 23, 2021

(54) METHODS, SYSTEMS, AND MEDIA FOR GENERATING A SUMMARIZED VIDEO WITH VIDEO THUMBNAILS

(71) Applicant: Google LLC, Mountain View, CA (US)

(72) Inventors: Matthias Grundmann, San Jose, CA (US); Alexandra Ivanna Hawkins, Torrance, CA (US); Sergey Ioffe, Mountain View, CA (US)

(73) Assignee: Google LLC, Mountain View, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 16/298,327

(22) Filed: Mar. 11, 2019

(65) Prior Publication Data
US 2019/0205654 A1 Jul. 4, 2019

Related U.S. Application Data

(63) Continuation of application No. 16/125,045, filed on Sep. 7, 2018, now Pat. No. 10,229,326, which is a (Continued)

(51) Int. Cl.
*G06K 9/00* (2006.01)
*G06K 9/62* (2006.01)

(52) U.S. Cl.
CPC ..... *G06K 9/00765* (2013.01); *G06K 9/00751* (2013.01); *G06K 9/623* (2013.01)

(58) Field of Classification Search
CPC ............... G06K 9/00765; G06K 9/623; G06K 9/00751; H04N 19/142
See application file for complete search history.

(56) References Cited

U.S. PATENT DOCUMENTS 7,042,525 B1  5/2006 Hong
8,531,535 B2  9/2013 Kwatra et al.
(Continued)

OTHER PUBLICATIONS

Dale, K. et al. "Multi-video browsing and summarization." In Computer Vision and Pattern Recognition Workshops (CVPRW), IEEE Computer Society Conference, Jun. 2012, pp. 1-8.
(Continued)

*Primary Examiner* — Carol Wang
(74) *Attorney, Agent, or Firm* — Byrne Poh LLP

(57) ABSTRACT

Methods, systems, and media for summarizing a video with video thumbnails are provided. In some embodiments, the method comprises: receiving a plurality of video frames corresponding to the video and associated information associated with each of the plurality of video frames; extracting, for each of the plurality of video frames, a plurality of features; generating candidate clips that each includes at least a portion of the received video frames based on the extracted plurality of features and the associated information; calculating, for each candidate clip, a clip score based on the extracted plurality of features from the video frames associated with the candidate clip; calculating, between adjacent candidate clips, a transition score based at least in part on a comparison of video frame features between frames from the adjacent candidate clips; selecting a subset of the candidate clips based at least in part on the clip score and the transition score associated with each of the candidate clips; and automatically generating an animated video thumbnail corresponding to the video that includes a plurality of video frames selected from each of the subset of candidate clips.

21 Claims, 13 Drawing Sheets

Related U.S. Application Data continuation of application No. 15/098,024, filed on Apr. 13, 2016, now Pat. No. 10,074,015.

(60) Provisional application No. 62/146,769, filed on Apr. 13, 2015.

(56) References Cited

U.S. PATENT DOCUMENTS

| | | | |
|---|---|---|---|
| 8,649,573 | B1 | 2/2014 | Darbari et al. |
| 8,942,542 | B1 | 1/2015 | Sherrets et al. |
| 9,247,129 | B1 | 1/2016 | Gray et al. |
| 2002/0061136 | A1 | 5/2002 | Shibata et al. |
| 2005/0120368 | A1 | 6/2005 | Goronzy et al. |
| 2007/0226624 | A1 | 9/2007 | Peker et al. |
| 2007/0237393 | A1 | 10/2007 | Zhang et al. |
| 2007/0245242 | A1 | 10/2007 | Yagnik |
| 2010/0215348 | A1 | 8/2010 | Saito |
| 2012/0281969 | A1 | 11/2012 | Jiang et al. |
| 2013/0156321 | A1 | 6/2013 | Motoi et al. |
| 2013/0336590 | A1 | 12/2013 | Sentinelli et al. |
| 2014/0023348 | A1 | 1/2014 | O'Kelly et al. |
| 2015/0243326 | A1 | 8/2015 | Pacurariu et al. |
| 2015/0262619 | A1 | 9/2015 | Oguchi et al. |

OTHER PUBLICATIONS

Grundmann, M. "Computational video: post-processing methods for stabilization, retargeting and segmentation." PhD diss., Georgia Institute of Technology, 2013.

Matsushita et al., "Full-Frame Video Stabilization with Motion Inpainting", in IEEE Transaction on Pattern Analysis and Machine Intelligence, vol. 28, issue 7, Jul. 2006, pp. 1150-1163.

Notice of Allowance dated May 9, 2018 in U.S. Appl. No. 15/098,024.

Notice of Allowance dated Oct. 29, 2018 in U.S. Appl. No. 16/125,045.

Office Action dated Mar. 7, 2018 in U.S. Appl. No. 15/098,024.

Pope, A. et al. "Video abstraction: Summarizing video content for retrieval and visualization" In Signals, Systems, & Computers. Record of the Thirty-Second Asilomar Conference vol. 1, Dec. 1998 pp. 915-919.

| Model | Translation $F_t^{(0)}$ | → | Similarity $F_t^{(1)}$ | • • |
|---|---|---|---|---|
| Degrees of freedom | 2 | | 4 | |
| Accounts for | Translation in x and y | + | Uniform scale and rotation | |

METHODS, SYSTEMS, AND MEDIA FOR GENERATING A SUMMARIZED VIDEO WITH VIDEO THUMBNAILS

CROSS-REFERENCE TO RELATED APPLICATIONS

This application is a continuation of U.S. patent application Ser. No. 16/125,045, filed Sep. 7, 2018, which is a continuation of U.S. patent application Ser. No. 15/098,024, filed Apr. 13, 2016, which claims the benefit of U.S. Provisional Patent Application No. 62/146,769, filed Apr. 13, 2015, each of which is hereby incorporated by reference herein in its entirety.

TECHNICAL FIELD

The disclosed subject matter relates to methods, systems, and media for generating a summarized video with video thumbnails.

BACKGROUND

Capturing a video can ensure that a certain moment is not missed. As the number of devices having video capturing capabilities increases (e.g., mobile telephones, smart phones, personal digital assistants, digital cameras, portable media players, etc.), an individual using one of these devices is generally able to capture that certain moment. Moreover, an individual tends to record a large amount of video when attending events, participating in activities, going on vacation, or the like. Such an individual often wants to share an interesting video that includes friends, family, or the public at large.

However, difficulties often arise when the individual wants to pick and choose the more interesting parts of the video that was recorded to be shared with others. In addition, the process of video editing can be extremely time consuming and difficult to master. For the amateur videographer, it can be frustrating to attempt to determine which parts of a video are the most interesting.

Accordingly, it is desirable to provide methods, systems, and media for generating a summarized video with video thumbnails.

SUMMARY

In accordance with various embodiments of the disclosed subject matter, methods, systems, and media for generating a summarized video with video thumbnails are provided.

In accordance with some embodiments of the disclosed subject matter, a method for summarizing a video is provided, the method comprising: receiving, using a hardware processor, a plurality of video frames corresponding to the video and associated information associated with each of the plurality of video frames; extracting, for each of the plurality of video frames, a plurality of features; generating candidate clips that each includes at least a portion of the received video frames based on the extracted plurality of features and the associated information; calculating, for each candidate clip, a clip score based on the extracted plurality of features from the video frames associated with the candidate clip; calculating, between adjacent candidate clips, a transition score based at least in part on a comparison of video frame features between frames from the adjacent candidate clips; selecting a subset of the candidate clips based at least in part on the clip score and the transition score associated with each of the candidate clips; and automatically generating an animated video thumbnail corresponding to the video that includes a plurality of video frames selected from each of the subset of candidate clips.

In accordance with some embodiments of the disclosed subject matter, a system for summarizing a video is provided. The system comprises a hardware processor configured to: receive a plurality of video frames corresponding to the video and associated information associated with each of the plurality of video frames; extract, for each of the plurality of video frames, a plurality of features; generate candidate clips that each includes at least a portion of the received video frames based on the extracted plurality of features and the associated information; calculate, for each candidate clip, a clip score based on the extracted plurality of features from the video frames associated with the candidate clip; calculate, between adjacent candidate clips, a transition score based at least in part on a comparison of video frame features between frames from the adjacent candidate clips; select a subset of the candidate clips based at least in part on the clip score and the transition score associated with each of the candidate clips; and automatically generate an animated video thumbnail corresponding to the video that includes a plurality of video frames selected from each of the subset of candidate clips.

In accordance with some embodiments of the disclosed subject matter, a non-transitory computer readable medium containing computer executable instructions that, when executed by a processor, cause the processor to perform a method for summarizing a video is provided. The method comprises: receiving a plurality of video frames corresponding to the video and associated information associated with each of the plurality of video frames; extracting, for each of the plurality of video frames, a plurality of features; generating candidate clips that each includes at least a portion of the received video frames based on the extracted plurality of features and the associated information; calculating, for each candidate clip, a clip score based on the extracted plurality of features from the video frames associated with the candidate clip; calculating, between adjacent candidate clips, a transition score based at least in part on a comparison of video frame features between frames from the adjacent candidate clips; selecting a subset of the candidate clips based at least in part on the clip score and the transition score associated with each of the candidate clips; and automatically generating an animated video thumbnail corresponding to the video that includes a plurality of video frames selected from each of the subset of candidate clips.

In accordance with some embodiments of the disclosed subject matter, a system for summarizing a video is provided. The system comprises: means for receiving a plurality of video frames corresponding to the video and associated information associated with each of the plurality of video frames; means for extracting, for each of the plurality of video frames, a plurality of features; means for generating candidate clips that each includes at least a portion of the received video frames based on the extracted plurality of features and the associated information; means for calculating, for each candidate clip, a clip score based on the extracted plurality of features from the video frames associated with the candidate clip; means for calculating, between adjacent candidate clips, a transition score based at least in part on a comparison of video frame features between frames from the adjacent candidate clips; means for selecting a subset of the candidate clips based at least in part on the clip score and the transition score associated with each of the candidate clips; and means for automatically generating an animated video thumbnail corresponding to the video that includes a plurality of video frames selected from each of the subset of candidate clips.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
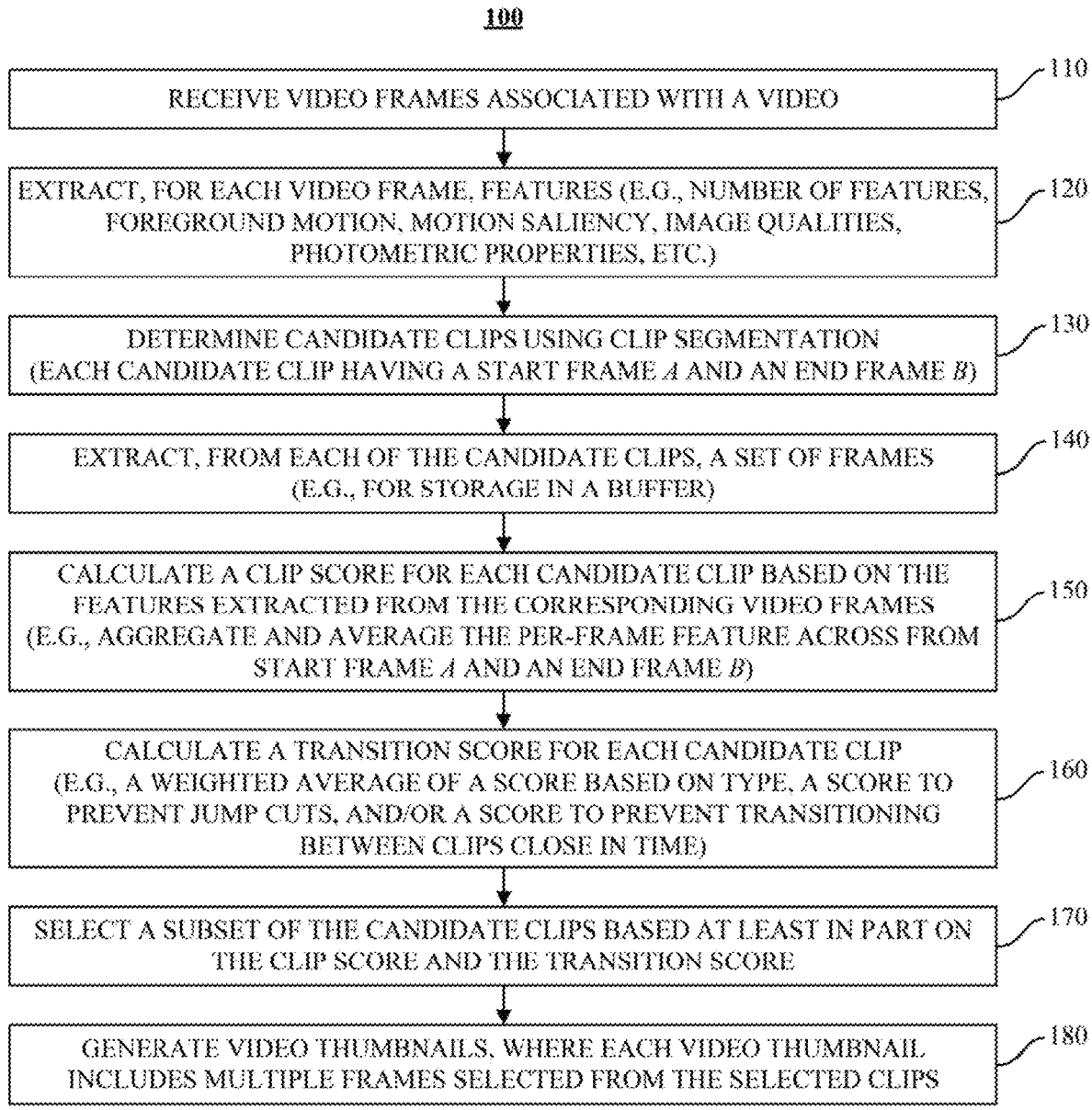
FIG. 1 shows an illustrative example of a process for generating a video thumbnail in accordance with some embodiments of the disclosed subject matter.

In accordance with various embodiments, mechanisms (which include methods, systems, and media) for generating a summarized video with video thumbnails are provided.

Generally speaking, when a user wants to share a video that the user recorded, the user can upload the video to a video sharing service or a content hosting service. Other users can access the video by using a search function (e.g., inputting one or more search terms and the video is provided as one of the search results responsive to the search terms), by selecting a link to a particular video, or the like.

It should be noted that the video provided by the user can be a video file of any suitable format, including by not limited to, any Motion Picture Experts Group (MPEG) format, H.264, QuickTime format, Audio Video Interleave (AVI) format, Windows Media Video (WMV) format, Flash Video (FLV) format, etc. It should be noted that a recorded video file can include any suitable amount of video, from a few minutes to many hours. For example, the video file can include a video sequence from a single event, such as the user's children playing in the backyard, to video sequences from several events, such as visits to different landmarks while sightseeing.

It should also be noted that, in some embodiments, each video can include multiple video frames and any suitable input information can be provided with each video frame. Examples of such input information can include video data, tracked features, original camera motion information, motion saliency information, tone statistical information, stabilized camera paths, and/or stabilizing image transforms. Any suitable type of input information can be provided or determined for each video frame in a video.

In response to receiving a video file to a video sharing service, a content hosting service, or any other suitable location, these mechanisms can provide the user and other users with a summarized version of the uploaded video file for sharing on the video sharing service. The summarized version of the uploaded video file can include generated video thumbnails that convey interesting motion from the video. That is, in response to receiving video frames associated with a video, the mechanisms can generate clips or segments of the video that are determined to contain interesting content and/or are determined to have particular characteristics for generating in thumbnail form (e.g., a sequence of images having small resolution). Particular clips can be selected from the generated clips based on a clip score calculated for each clip and a transition score calculated between two clips. Particular frames can then be selected from each selected clip and stitched together to form a video thumbnail that may convey motion. One or more of these video thumbnails can then be selected and stitched together to form a summarized version of the video.

It should be noted that particular clips can be selected to optimize for small background motion with a given amount of foreground motion. It should also be noted that, while optimizing for foreground motion with a small amount of background motion, particular clips can be selected that are stable. Examples of a selected clip with small background motion after stabilization and with at least a threshold fraction of foreground motion can include a child running, a car driving by, etc.

In some embodiments, if no such clips containing stable content can be found, particular clips containing content that has a constant velocity with respect to camera motion can be selected. Examples of a selected clip with constant velocity include a linear pan.

In some embodiments, when selecting clips, the mechanisms can calculate a transition score between clips and select particular clips based at least in part on the transition score. For example, the mechanisms can inhibit jump cuts (e.g., clips that include similar content), cuts between a clip containing a pan and an adjacent clip containing a pan, clips occurring close in time (e.g., within a particular threshold time period), etc.

In some embodiments, the mechanisms can further modify the summarized video by, for example, adding audio (e.g., a soundtrack), adding effects, adding annotations, or any other suitable modifications.

These mechanisms can be used in a variety of applications. For example, these mechanisms can provide a summarized video as a preview of the uploaded video, where the preview can be presented on any suitable device (e.g., in a video viewing application) or any suitable service (e.g., a video sharing service, a social networking service, etc.). In another example, these mechanisms can allow a user to provide a substantial amount of video content and automatically create a summarized video that is appealing and engaging to viewers.

These and other features for generating a summarized video with video thumbnails are further described in connection with FIGS. 1-16.

Turning to FIG. 1, an example 100 of a process for generating a summarized video with video thumbnails is shown in accordance with some embodiments of the disclosed subject matter. At 110, video frames associated with a video can be received. For example, in some embodiments, the received video can be a video file that was uploaded to an online video storage service, online video editor, or social network from a user device (e.g., a personal computer, a laptop computer, a mobile telephone, a smartphone, a smartphone having a camera, a tablet computer, a camera device, a portable media player, a wearable computer, etc.). In another example, the video can be a video file that was retrieved from a storage device coupled to a device that is executing the editing application. In yet another example, the video can be a video file that was received via an email or a text message, where the summarized video can be presented as a preview of the received video.

In some embodiments, the received video and associated video frames can be in a digital file format (e.g., the video file can be saved in a particular file format), a digital stream of data (e.g., the video file can be received as a bitstream of video content), as a stream of data representing analog video data (e.g., video data can be received from an analog device, such as a videocassette recorder (VCR)), etc. Additionally, the video file can include audio data, video metadata, and/or any other data or information suitable for inclusion with a video file.

In some embodiments, video data in the video file can be recorded at any suitable resolution, aspect ratio, and frame rate. For example, in some embodiments, the video data in the video file can be SVGA video, High Definition (HD) video, Full HD video, etc. Additionally, the video data in the video file can be at any suitable frame rate (e.g., 24 frames per second (FPS), 30 FPS, 48 FPS, 60 FPS, etc.) and can be recorded in either progressive scan or interlace scan formats.

As mentioned above, the video file can be encoded in any suitable format, including by not limited to, any Motion Picture Experts Group (MPEG) format, H.264, QuickTime format, Audio Video Interleave (AVI) format, Windows Media Video (WMV) format, Flash Video (FLV) format, or any other suitable compression format. In another example, the video data can be encoded in a file or streamed as uncompressed (or raw) video data.

Additionally to the received video data, any suitable input information associated with each video frame can be received and/or obtained. For example, in some embodiments, input information can be received from a server or other suitable computing device that determines input information from a received video (e.g., the number of tracked features in each frame of a received video). In another example, in some embodiments, in response to receiving a video, input information can be determined for the received video and associated with that video (e.g., for retrieval at a later time). In a more particular example, in response to receiving a video, the video can be separated into its video frames and, for each video frame, video information can be determined, which can include the total number of tracked features, motion information of the camera device that captured the video, motion saliency information for indicating how much image content is affected by foreground motion, tone statistical information for indicating how much image content is overexposed or underexposed, blur information for indicating how sharp the image content is, etc.

In some embodiments, the input information associated with each video frame can include tracked features that estimate the motion path of the camera device between two frames. This can include determining, in a video frame of a video captured by a camera, features with a distinguishable geometric characteristic, and the frame can include a plurality of sets of pixels captured sequentially in time. As described above, a camera device or any other suitable image capturing device can have recorded a video, for example, and the video can have been uploaded to and received at a computing device, such as a computer, laptop, mobile phone, etc., or a server. The video can include a sequence of frames, where each frame can include a plurality of sets of pixels. The sets of pixels may be rows or columns of pixels, for example. The computing device can be configured to determine features or locations that can be tracked in frames of the video. For example, the computing device can be configured to identify features in a frame of the video that have a distinguishable geometric characteristic. That is, tracked features can act as markers for objects appearing in a video frame. As a more particular example, the computing device can be configured to determine corners at pixel locations where two lines depicted in the frame converge (e.g., the location where two sides of a building intersect) where both eigenvalues of a second moment matrix of pixel intensities are above a pre-defined threshold. The threshold may be chosen with respect to a maximum eigenvalue across all pixels, effectively imposing a frame-global threshold. It should be noted that corners are used as an example for illustration only, and features with other geometric characteristics can be used.

In a more particular example, tracked feature matches in frames of the video can be extracted. For example, tracked features in each frame of the video are extracted, or tracked features in substantially all frames of the video are extracted. Tracked features in frames of the video can be extracted using feature tracking software, such as the pyramidal Lucas-Kanade feature tracking. Features can be tracked from frame to frame using any number of methods. Example features for extracting include corners of an image in which intensity changes along the x and y dimension of an image. In another example, tracked features between two frames may be extracted by extracting a number of features in a first video frame (e.g., based on x and y location) and tracking the extracted features in a next video frame. For example, if the video is a sequence of images, $I_1, I_2, \ldots I_n$, video frame pairs may be $(I_{t-1}, I_t)$, and feature pairs between video frames can be extracted (e.g., for each feature x in frame $I_{t-1}$, a corresponding feature y at the same point in space as the feature x is found in frame $I_t$). With small intra-frame motions and changes in illumination, brightness values of a small image patch (e.g., 7×7 pixels) centered around the feature point x in $I_{t-1}$ and its matching pointy in $I_t$ may be nearly identical. For each feature x in $I_{t-1}$, a displacement vector d can be determined such that the $I_{t-1}(x)=I_t(x+d)$, and therefore x+d=y using the previous notation (e.g., that is feature matches (x<->y)). This expression can be linearized by a Taylor Series expansion around x, yielding $DI_t(x)*d=I_{t-1}(x)-I_t(x)$ which is linear in the unknown displacement vector d. An over determined linear system of equations can be determined of the form A*d=b that can be then solved by using normal equations (i.e., solving the symmetric linear system $A^TA\ d=A^Tb$ by Gaussian Elimination, where $A^T$ denotes the transpose of A). This process can sometimes be referred to as pyramidical Lucas-Kanade Tracking.

In another more particular example, the motion of individual tracked features between frame pairs can be tracked to determine how objects in the video move between frames. In aggregate, the motion $M_t$ of the tracked features between a pair of adjacent frames can be analyzed to separate object motion within the frame from motion of the capturing camera device. In some embodiments, the tracked features $T_t$ for a frame can be generated by applying a corner measure to the pixels of the frame (e.g., a Harris corner measure). The corner measure generates a tracked feature at each pixel in the frame where a corner appears, that is, where the vertical and horizontal lines of significant gradient in pixel color meet. More particularly, the tracked features are located at pixels where the minimum eigenvalue of the auto-correlation matrix of the gradient of the frame is above a threshold after non-maxima suppression. The tracked features can be stored as a set of two-dimensional points, each tracked feature having an x and y axis coordinate with the Cartesian coordinate system of the frame of the video.

Figure 2:
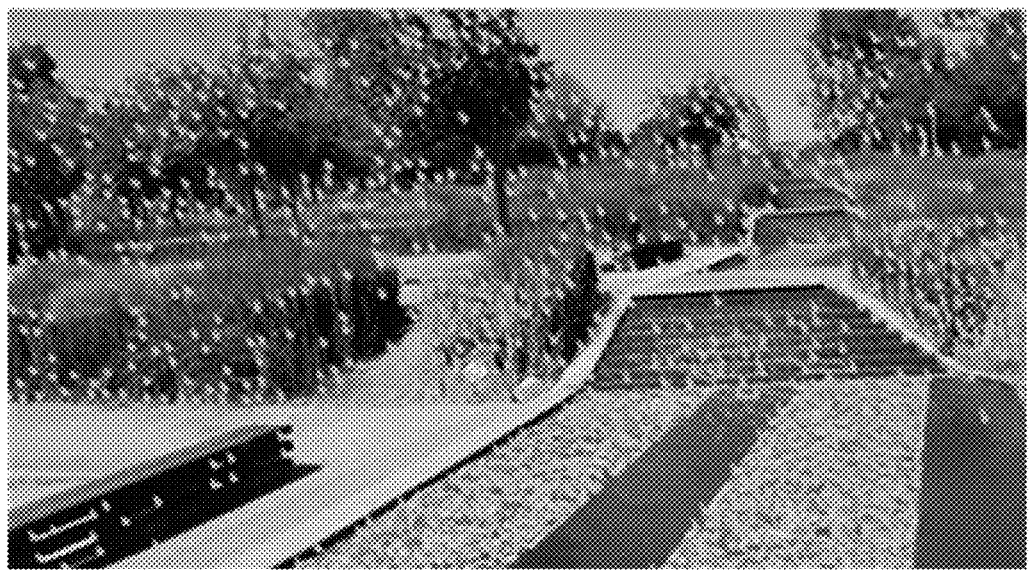
FIG. 2 shows an illustrative example of tracked features in a video frame in accordance with some embodiments of the disclosed subject matter.

An illustrative example of tracked features is shown in FIG. 2. As shown, the colored arrows identify tracked features within the particular video frame. It should be noted that, as shown in FIG. 2, these tracked features can aggregate around highly textured areas. Accordingly, the total number of tracked features can be used as an indicator of interesting content. Conversely, a fewer number of tracked features can indicate that the content in the video frame includes fast and/or abrupt motions.

These and other features for determining tracked features that capture motion information are further described, for example, in commonly-owned, commonly-assigned U.S. Pat. Nos. 8,531,535, 8,860,825, and U.S. Patent Application Publication No. 2014/0267801.

In some embodiments, the input information associated with each video frame can include motion information of the original camera device. For example, the tracked features of adjacent frames described above can be used to indicate an inter-frame motion of the camera device. A number of different motion models can each be individually applied to the tracked features of a video frame to determine properties of the motion models, where each motion model can have a different number of degrees of freedom. Based on the determined properties, a determination can be made regarding which of the motion models are valid. A camera path describing the motion of the camera device used to capture the video can be generated based on the motion models that are valid for the inter-frame motion between the adjacent frames.

Figure 3:
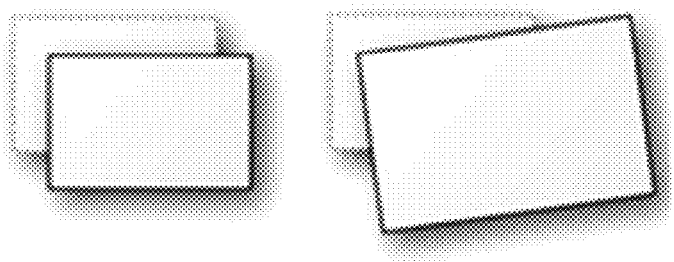
FIG. 3 shows an illustrative example of various motion models in accordance with some embodiments of the disclosed subject matter.

FIG. 3 illustrates a number of motion models each having a different number of degrees of freedom in accordance with some embodiments of the disclosed subject matter. As shown, the first motion model $F_t^{(0)}$ is a translation model having two degrees of freedom for detecting motion along the x and y axes of the video frame. As also shown, the second motion model $F_t^{(0)}$ is a similarity model with four degrees of freedom for detecting rotations and uniform scaling (e.g., size of the frame) as well as for detecting translation.

It should be noted that, in response to selecting a motion model, such as the second similarity model having four degrees of freedom, the motion model is converted to a one dimensional scalar during feature extraction and, in particular determining average warp distance as described herein below.

It should also be noted that, in some embodiments, a determination can be made, for each model, how well it fits the tracked features or tracked motion vectors. If the model is deemed unreliable, the model can be flagged as being unstable, where unstable models can cause a discontinuity in warp distance.

These and other features for determining camera motion information are further described in commonly-owned, commonly-assigned U.S. Patent Publication No. 2014/0267801.

In some embodiments, the input information associated with each video frame can include motion saliency information. For example, in response to determining camera motion information from the tracked features, a determination as to how well each feature fits or supports the determined camera motion information can be made.

In a more particular example, for a feature (x,y), where x is its position in frame t and y is its corresponding position in frame t−1, the residual r can be determined using an estimated similarity model $S_t$, which can be represented by:

$$S_t:r=|y-S_t(x)|$$

Figure 4:
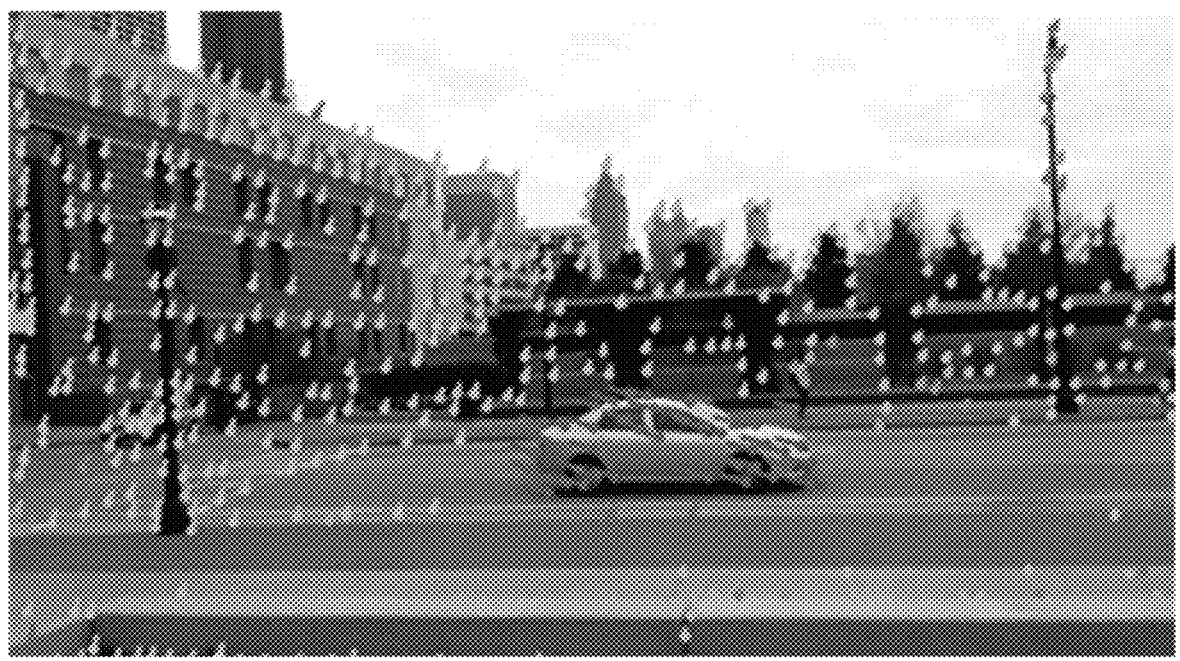
FIGS. 4 and 5 show illustrative examples of a heatmap for each feature designating foreground motion and background motion in accordance with some embodiments of the disclosed subject matter.

It should be noted that, in considering 1/r, high values can reflect low fitting errors (the feature fits or supports the camera motion information well), while low values can reflect high fitting errors (the feature does not fit or support the camera motion information well and is part of the foreground). As shown in FIG. 4, the 1/r calculation for a video frame can be shown as a heatmap for each feature, where low values of 1/r indicate foreground motion (represented in red around the car) and high values of 1/r indicate background motion (represented in green around, for example, the building).

In some embodiments, a determination can be made as to how much image content in the video frame is affected by foregoing motion. In continuing with the example shown in FIG. 4, the area of the car can be determined, which can include fitting ellipses around clusters of foregoing features.

Figure 5:
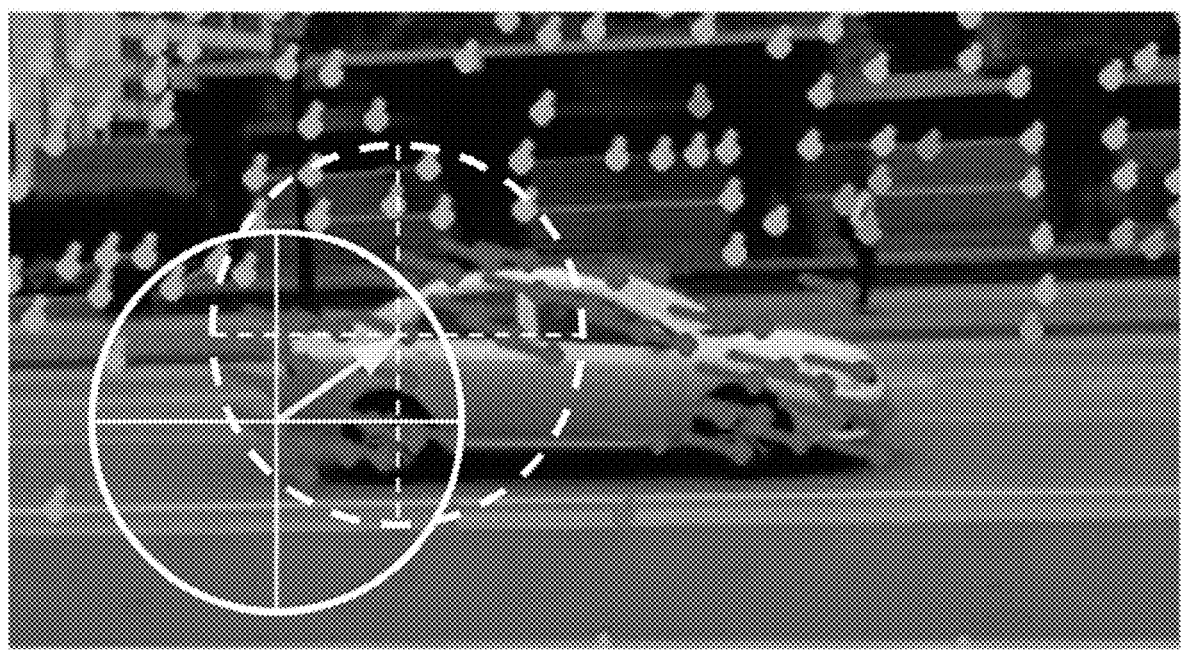

In some embodiments, this can include removing background features. For example, features having a 1/r value that is greater than a particular threshold value (e.g., 0.5) can be removed as being deemed a background feature. In response to removing the background features, a mean shift procedure can be performed. As shown in FIG. 5, for each feature, neighbors within a spatial circular window can be considered. It should be noted that the size of the spatial circular window can determine how large the final ellipses is. It should also be noted that, in performing the mean shift procedure, small details can be suppressed, while large details can be captured.

In turn, the weighted average of the spatial locations can be determined, which results in a new location. It should be noted that the shift in the spatial circular window (e.g., the solid circular window to the dashed circular window shown in FIG. 5) can be represented by a mean vector (shown as the orange vector between the solid circular window and the dashed circular window shown in FIG. 5). This can be iterated until convergence such that, for each feature, a final location can be obtained. As modes of different features can be equal or close in proximity, the features that ended up at the same mode can be collected and an ellipse can be fitted around these features. Fitting the ellipse can include, for example, computing two-dimensional mean and variance matrix of locations, where variance matrix eigenvectors are the major and minor axes of the ellipse and the mean is the center.

Figure 6:
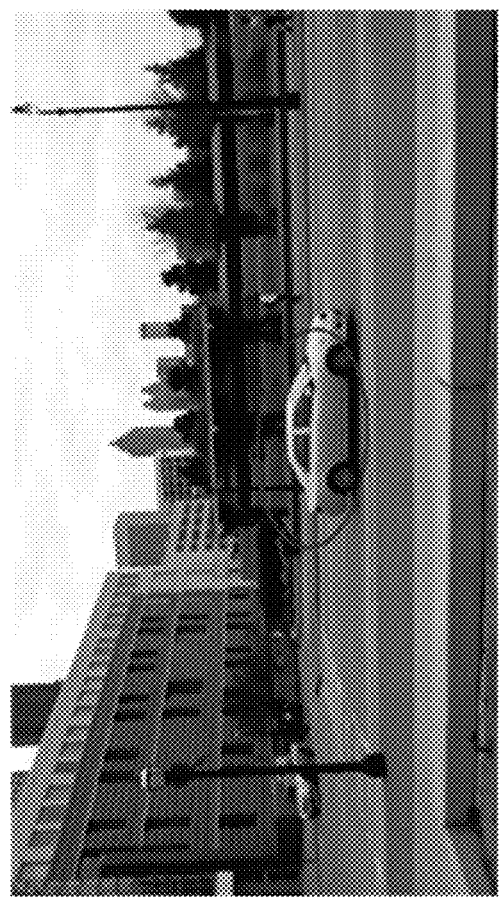
FIG. 6 shows an illustrative example of an ellipsis placed over a foreground object in accordance with some embodiments of the disclosed subject matter.

An illustrative example of such an ellipse is shown in FIG. 6. In some embodiments, the determined ellipse can be smoothed across time using any suitable approach.

In some embodiments, a feature can use the area of the determined ellipse normalized to the frame area, which indicates the fraction of the frame that is covered by moving foreground.

In some embodiments, the input information associated with each video frame can include tone statistical information. For example, tone statistical information can capture photometric properties of the image and, more particularly, indicate how well exposed the content in the frame are and that a particular amount of the content is not overexposed.

In some embodiments, tone statistical information can include a statistic that counts the number of pixels in the image domain based on intensity values. For example, the tone statistical information can count the number of pixels in the image domain having an intensity below a particular low threshold value (e.g., 2%) or above a particular high threshold value (e.g., 98%) for at least two of the three color channels. It should be noted that the low threshold value and the high threshold value can be selected based on a determination as to when pixels are considered underexposed or overexposed. In some embodiments, the tone statistical information can be represented as a fraction of the above-mentioned number of pixels with respect to the total number of pixels per frame, thereby resulting in a ratio between 0 and 1 of how many pixels are considered underexposed or overexposed. It should be noted that a lower ratio (e.g., having few pixels are considered underexposed or overexposed) corresponds to a better image based on tone statistical information.

In some embodiments, tone statistical information can include exposure range information. For example, an image in a video frame that is in an RGB color model can be converted to a grayscale representation, where pixel intensities of the grayscale representation can be sorted from lowest to highest. In a more particular example, upon sorting the grayscale values, the values of the lowest 5% and the highest 95% can be determined, where the exposure range can be represented by the difference between these two values. It should be noted that a higher exposure range value can reflect that a video frame is better exposed in that it covers the visible spectrum.

In some embodiments, the input information associated with each video frame can include stabilized camera path information and/or stabilized image transform information. For example, such input information can be used to determine portions of the video that, after stabilization, contain no motion or have constant velocity.

For example, a video can be stabilized by performing post-processing techniques, where the video can be processed to estimate an original path (e.g., motion) of a camera device that recorded the video, to estimate a new steady and/or smooth camera path, and to recast the video from the original path to the smooth camera path. That is, given the camera path information described above (path 720 in FIG. 7B) and an envelope around the camera path (e.g., the size of a virtual crop window 710 in FIG. 7A) (envelope 730 in FIG. 7B), a new camera path that includes constant and/or linear segments and has a minimized number of junctions and discontinuities.

Figure 7B:
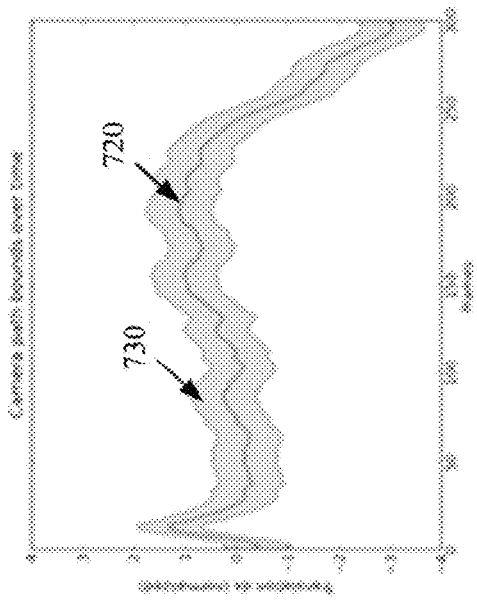
FIGS. 7A and 7B show illustrative examples of a crop window for a particular frame and an envelope around the associated camera path in accordance with some embodiments of the disclosed subject matter.
Figure 7A:
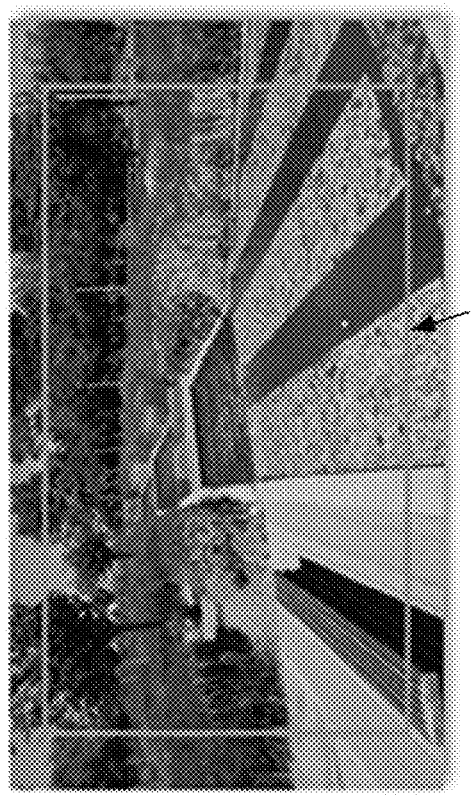
Figure 8A:
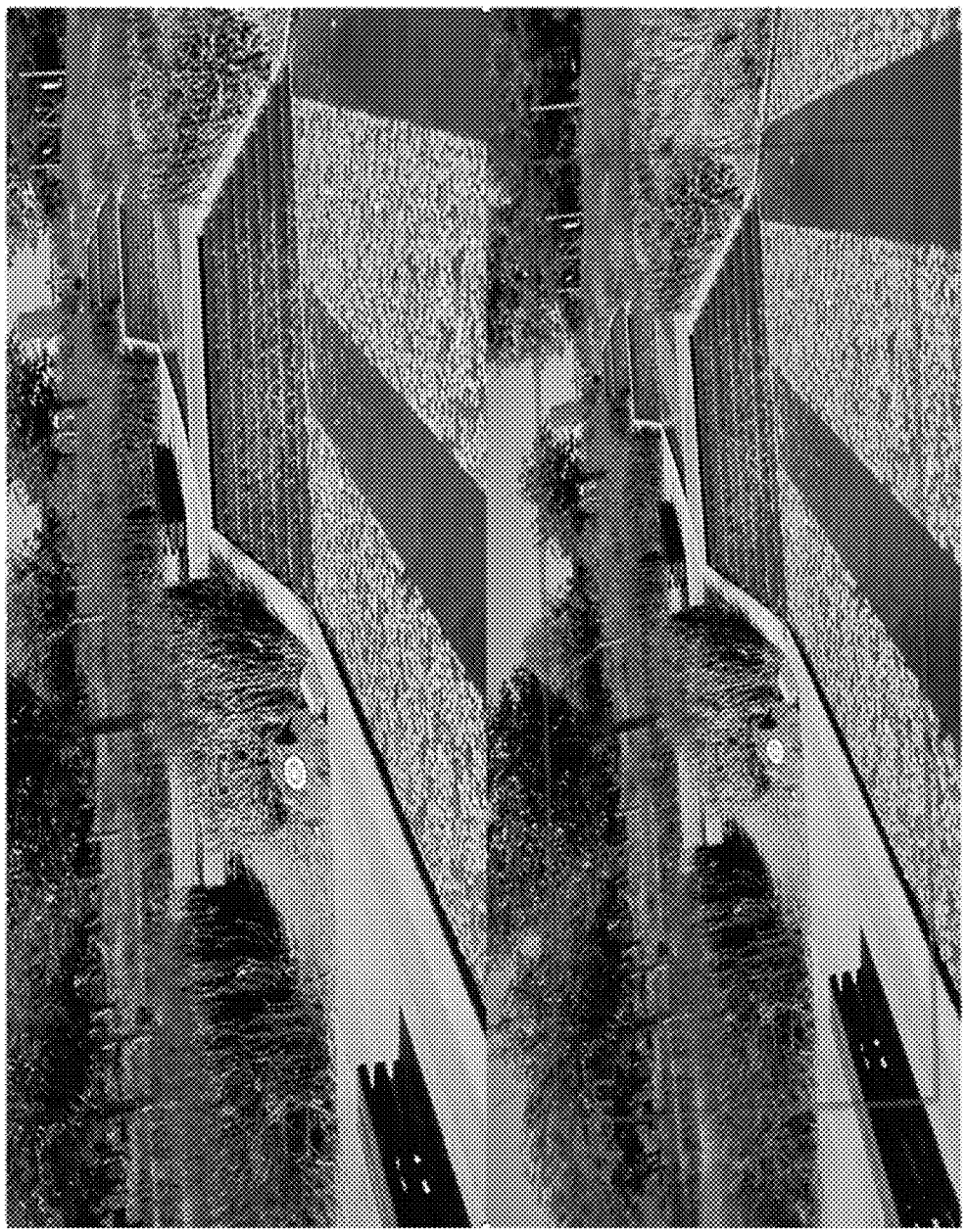
FIGS. 8A and 8B show illustrative examples of how a difference transformation between the original and stabilized camera path can be applied to a video using the crop window to recast the video as if the video had been recorded from the stabilized camera path in accordance with some embodiments of the disclosed subject matter.
Figure 8B:

In some embodiments, to estimate a new camera path, a virtual crop window of a predefined scale less than one with respect to an original frame size of the video frame can be designated. An example of an illustrative virtual crop window is shown in FIG. 7A. A difference transformation between the original and smooth camera path can be applied to the recorded video using the crop window to recast the video as if the video had been recorded from the smooth camera path to remove shake from the video. This is shown, for example, in FIGS. 8A and 8B.

Figure 9:
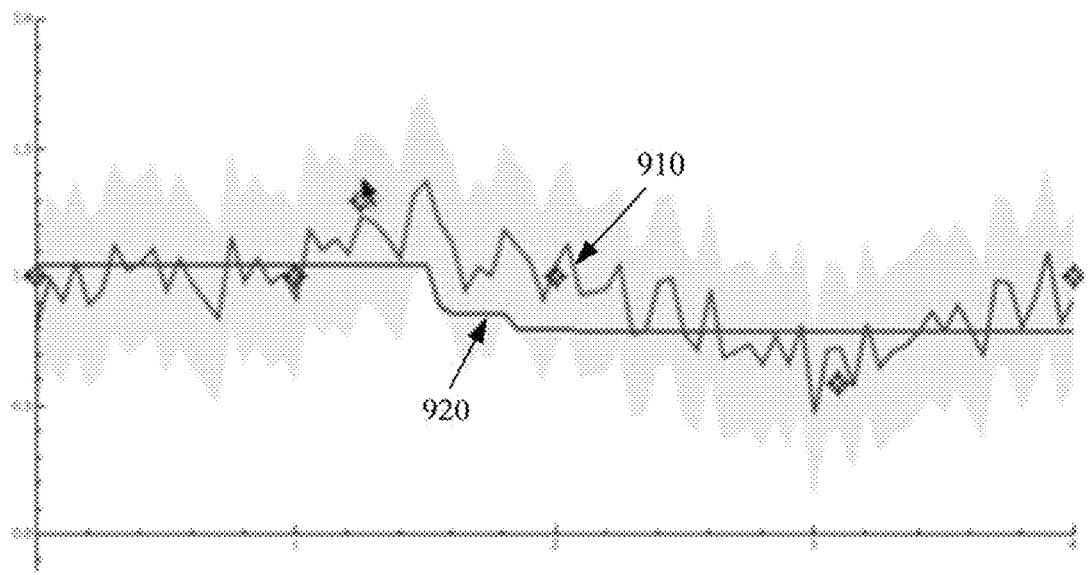
FIGS. 9 and 10 show illustrative examples of stabilized camera path in accordance with some embodiments of the disclosed subject matter
Figure 10:
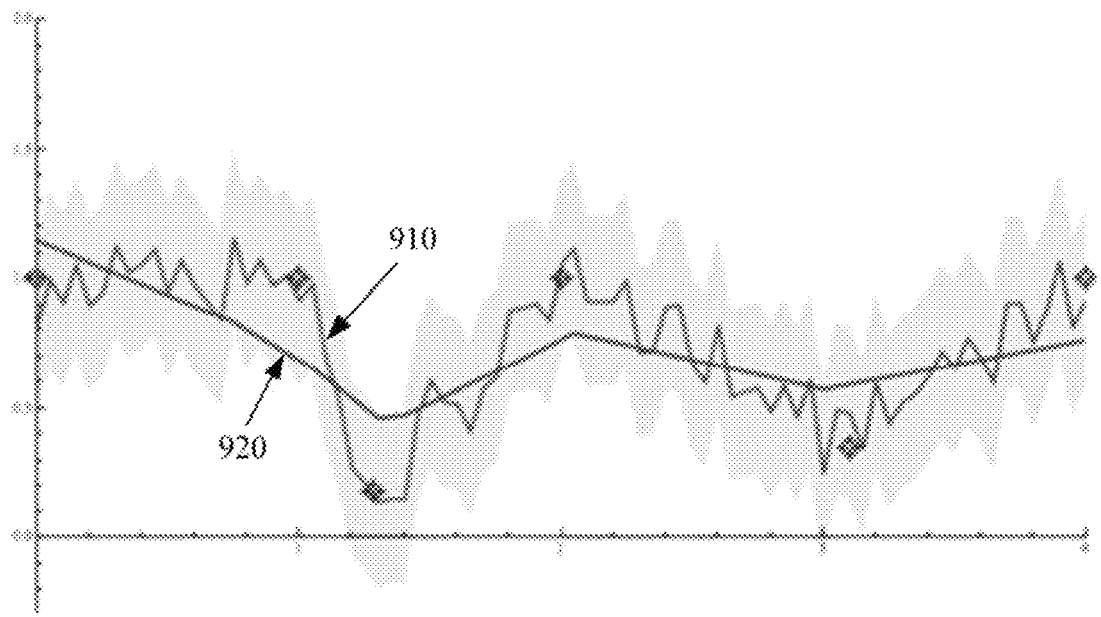

It should be noted that, as described herein below, the stabilized camera path can be used for clip segmentation by transforming it to the average warp distance. The difference between the original camera path and the smooth or stable camera path yields a crop transform. For example, as shown in FIGS. 9 and 10, the original camera path is shown by line 910 and the stabilized camera path, which is smooth and stable, is shown by line 920, where the difference between the original camera path and the stabilized camera path is the crop transform. The crop transform can be stored in a suitable storage device such that, in some embodiments, the thumbnails selected for the summarized version of the video can be stabilized using the crop transform.

In some embodiments, stabilization can be performed with respect to any suitable objective. For example, stabilization can be performed, where the objective is to obtain constant paths while minimizing the amount of discontinuities. In another example, stabilization can be performed, where the objective is to obtain constant velocity paths while minimizing the amount of discontinuities. An illustrative example of a constant path having the fewest number of junctions is shown in FIG. 9 and an illustrative example of a constant velocity path is shown in FIG. 10.

These and other features for determining stabilized camera path information and/or stabilized image transform information are further described, for example, in above-mentioned U.S. Pat. No. 8,531,535.

In some embodiments, the input information associated with each video frame can include blurry frame information. For example, such input information can be used to flag or otherwise designate blurry frames to avoid the inclusion of blurry frames into the video thumbnail and/or the summarized video.

To determine blurry frames, it should be noted that image corners tend to transform into lines under motion blur—the smallest eigenvalue of the 2nd moment matrix of the corner measure is reduced by blur regardless of the corners orientation or the direction of the blur. It should also be noted that blur may only be measurable in areas of high contrast with low textured regions being less affected by motion blur.

As described above, the tracked features for a frame can be generated by applying a corner measure to the pixels of the frame. The corner measure generates a tracked feature at each pixel in the frame where a corner appears, that is, where the vertical and horizontal lines of significant gradient in pixel color meet. Corner measure, in some embodiments, can also be used to quantify blur.

In some embodiments, to flag individual video frames as blurred, a blur score for each video frame can be calculated, where the blur score can represent how much of the high frequency component has been removed from the frame in comparison to the neighboring frames. For example, the inverse of the sum of squared gradient measure can be used to evaluate the relative blurriness because of its robustness to image alignment error and its computational efficiency. By denoting two derivative filters along the x- and y-directions by $f_x$ and $f_y$, respectively, the blurriness measure can be represented by:

$$b_t = \frac{1}{\sum_{p_t}\{((f_x * I_t)(p_t))^2 + ((f_y * I_t)(p_t))^2\}}$$

$$b'_t = \frac{1}{\sum_{p_t} C_t(p_t)}$$

where the blurriness measure used herein takes the sum over the corner measure $C_t$ of an image $I_t$.

It should be noted that, while the blurriness measure does not give an absolute evaluation of image blurriness, the blurriness measure yields relative image blurriness among similar images when compared to the blurriness of other images. Hence, for this particular blurriness measure, the blurriness measure can be restricted to be used in a limited number of neighboring frames where significant scene change is not observed. Also, the blurriness measure can be computed using a common coverage area which is observed in the neighboring frames under consideration. Relatively blurry frames are determined by comparing a blur score of a video frame to a blur score of an adjacent video frame. For example, a blur score of a video frame can compared to a blur score of an adjacent video frame within a radius of fifty frames and the blur ratio can be stored.

In some embodiments, the ratio of blur scores can be weighted by any suitable number of weights. For example, the ratio of blur scores can be weighted by two Gaussian weights (e.g., between 0 and 1). In a more particular, one Gaussian weight can give preference to frames closer in time (e.g., $\sigma_t$=50 frames) and the other Gaussian weight can give preference to frames with more scene overlap (e.g., $\sigma_a$=35% with respect to frame area computed by intersecting frame rectangles warped by linear similarities F(1) F1, see FIG. 3). If the weighted ratio is greater than a particular threshold value (e.g., 2.5), the frame can be flagged as being blurry.

In some embodiments, the input information associated with each video frame can include shot boundary information. For example, such input information can be used to avoid clip segmentation across shot boundaries or fades in a video, which may cause the resulting video thumbnail and/or the summarized video to appear abrupt.

For example, to determine shot boundary information, visual consistency between video frames can be determined and/or stored, where visual consistency can be represented by the absolute change in visual difference between two adjacent video frame pairs—i.e., the magnitude of the second derivative of the frame appearance. This can include, in some embodiments, downsizing the image to one having a small resolution (e.g., 20×20) and computing the median difference across all pixels. In this example, visual consistency can be defined as the difference of the median difference across the video frames. It should be noted that a higher value means low visual consistency.

Referring back to FIG. 1, upon receiving the video frames and one or more pieces of input information associated with each of the video frames, process 100 can extract and store per-frame features for each input at 120. Generally speaking, extracted features for each frame can be used to select clips having good looking and/or interesting content.

Extracted features can include the features that describe how interesting the content is or the amount of content in a particular video segment. For example, as described above, the number of tracked features can be used as an indicator of interesting content in a clip as tracked features can aggregate around highly textured areas. Conversely, a fewer number of tracked features can indicate that the content in a video frame includes fast and/or abrupt motions, which may not be preferable for clip selection. In another example, as described above, the amount of foreground motion can be used as an indicator of interesting content in a clip as more foreground motion can be deemed as more interesting content. Extracted information relating to foreground motion can include the average residual feature motion (e.g., where camera motion is subtracted from feature motion). In yet another example, as described above, motion saliency information can be used to determine an area of the foreground that is covered by salient ellipses.

In some embodiments, the extracted features can include image quality and/or photometric properties. For example, as described above, this can include properties relating to camera motion, such as the number of sharp frames, frames that are flagged as blurry frames, and frames that has visual consistency based on shot boundary information. In another example, the extracted features can include exposure range information.

In some embodiments, process 100 can generate and determine candidate clips using clip segmentation at 130 and a set of frames can be extracted from at least a portion of the candidate clips at 140. For example, clip segmentation can be used to generate clips that may be included in a video thumbnail. In a more particular example, clip segmentation can be used to find content (e.g., no camera motion) and linear segments (e.g., constant velocity) in the camera path after stabilization across a particular period of time in the video (e.g., across thirty seconds of video). In the example of streaming video that is being received, clip segmentation can be performed for every N frames (e.g. N frames from thirty seconds of video). This can sometimes be referred to as a chunk.

Figure 11:
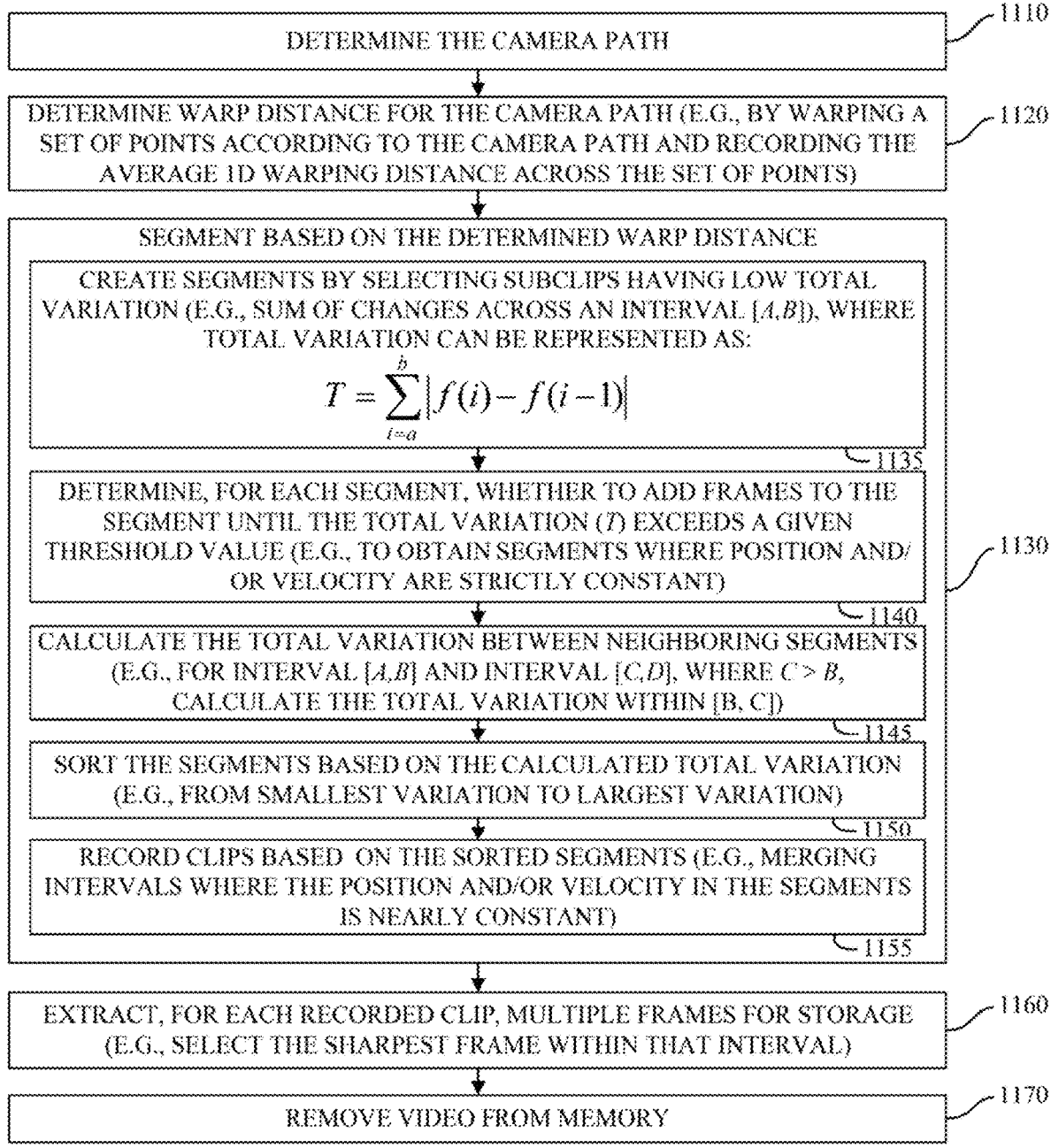
FIG. 11 shows an illustrative example of a process for clip segmentation based on warp distance in accordance with some embodiments of the disclosed subject matter.

In some embodiment, clip segmentation includes a determination of warp distance for each stabilized camera path. Warp distance can be represented by the distance points within the image domain from frame to frame. FIG. 11 shows an illustrative example of a process for clip segmentation based on determined warp distance in accordance with some embodiments of the disclosed subject matter.

Turning to FIG. 11, a stabilized camera path can be determined from the input information described above at 1110. At 1120, a warp distance can be determined for the stabilized camera path. For example, the warp distance can be determined by warping a set of points in a video frame according to the stabilized camera path (e.g., path 920 in FIGS. 9 and 10) and recording the median of the one dimensional warping distance across the set of points. In a more particular example, a set of points within a rectangular grid the virtual crop window (e.g., the inner 4×4 portion of a 6×6 grid) can be warped according to the stabilized camera path. The warping distance is then recorded and/or stored in a suitable storage device.

It should be noted that explicit discontinuities in the warp distance can be created for video frames with an unstable camera model, no features, no motion or shot boundaries. For example, it may be desirable to have clips containing homogeneous content.

It should also be noted that it may be desirable to include panned content in a single direction for a particular clip. For example, this can include determining whether the angle between adjacent warped vectors is greater than a particular threshold value (e.g., a significant angle is one that is greater than twenty five degrees) and create discontinuities in the warp distance for video frames with high warp distance.

In response to determining warp distance, video segments can be selected based on the warp distance at 1130. Generally speaking, this is performed by forming intervals that are strictly constant in position or velocity and then determining whether to merge these intervals. For example, if the difference in total variation described below is small between two adjacent intervals, these intervals can be merged such that the resulting intervals contains content that is nearly constant in position or velocity.

In a more particular example, selecting video segments based on warp distance can begin by forming intervals that are strictly constant in position or velocity at 1135. For example, subclips or intervals having very low total variation can be selected. It should be noted that total variation is the sum of changes across a discretized interval [a, b], where the total variation can be represented by:

$$T = \sum_{i=a}^{b} |f(i) - f(i-1)|$$

For paths having constant position, f(i) is the warp distance w(i) at frame i. For paths having constant velocity, f(i) is the difference in warp distance at different frames: f(i)=w(i)−w(i−1).

In some embodiments, at 1140, it can be determined whether to add additional frames to each of the created video segments. For example, to obtain video segments where position or velocity are strictly constant, one or more video frames can continue to be added to a video segment until a threshold value of total variation is reached. In a more particular example, this can be done iteratively where a video frame is added in a frame-by-frame approach to a video segment until the total variation becomes larger than a threshold value of total variation (e.g., 10% of regular cutoff).

In some embodiments, process 1100 can use any suitable technique to group video segments that are strictly constant in position or velocity together to create a larger clip. For example, single link agglomerative clustering can be performed to determine whether to merge two video segments. In a more particular example, for a video segment spanning the interval [a,b] and a video segment spanning the interval [c,d] where c>b, the total variation within [b,c] can be calculated at 1145.

At 1150, video segments can be sorted or ranked based on the calculated total variation (e.g., from small variation to largest variation). Traversing from smallest to largest, video segments can continued to be merged iteratively until the total variation of the merged interval exceeds a given threshold value. For example, with clip segmentation, clips of the same type that are adjacent across a chunk boundary can be merged. At 1155, clips based on the merged and sorted video segments can be recorded.

In some embodiments, multiple frames can be extracted from each recorded clip at 1160. For example, instead of decoding the video multiple times (e.g., at feature extraction and at video thumbnail generation), multiple frames can be extracted from each recorded clip based on any suitable criterion and stored in a suitable storage device (e.g., a buffer)

Frames from each recorded clip can be selected based on any suitable approach. For example, in some embodiments, the sharpest frame within the recorded clip can be extracted for storage. The sharpest frame can be stored in a compressed JPEG format. In continuing with this example, when generating video thumbnails and the particular clip is selected for inclusion in a video thumbnail, the sharpest frame in the compressed JPEG format can be decompressed and used for generating the video thumbnail along with other selected frames.

In a more particular example, for each recorded clip, N frames can be sampled in equidistant intervals. For the interval [a,b], frames can be sampled at the center, where:

$$c_i = a + (b-a)/(N-1)*i, \text{ where } i = 0 \ldots N-1.$$

In some embodiments, the quality of the resulting thumbnail extracted from the clip can be sampled slightly off-center $c_i$. For example, for selecting a frame from a recorded clip, the sharpest video frame within one second of video around $c_i$ can be selected and stored as a JPEG compressed bitmap.

In some embodiments, at 1170, upon recording particular clips and selecting the sharpest frame from each recorded clip, the video can be removed from memory or otherwise discarded.

Referring back to FIG. 1, a clip score for each candidate clip can be calculated based on the features extracted from the corresponding video frames. Generally speaking, as each video clip has a start frame a and an end frame b such that it covers the interval [a,b] and, as described above in connection with 120 of FIG. 1, features have been extracted for each frame within [a,b], process 100 can determine a clip score for each clip. This can, for example, describe how good the clip is with respect to content (e.g., interesting content) and photometric qualities. In a more particular example, process 100 can aggregate multiple features and average the per-frame feature across the interval [a, b].

Figure 12:
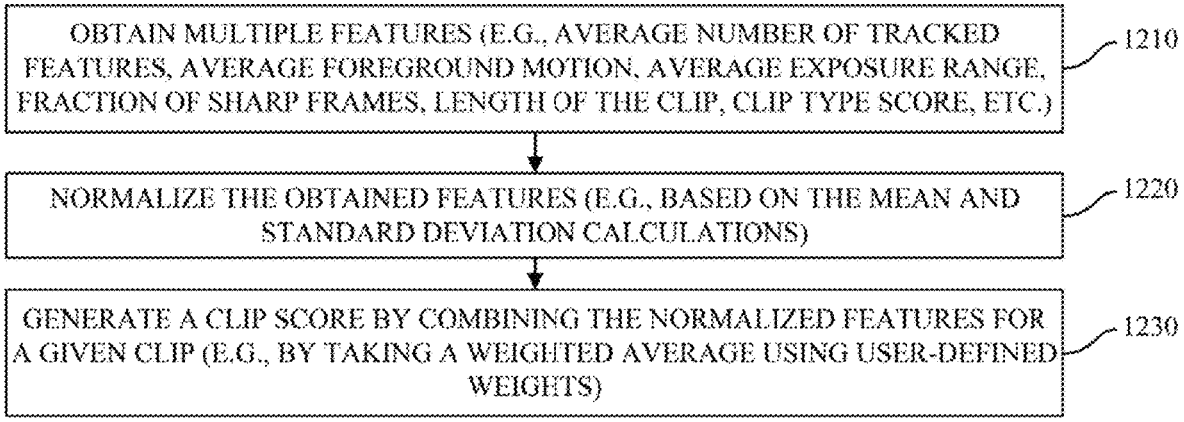
FIG. 12 shows an illustrative example of a process for generating a clip score for each candidate clip in accordance with some embodiments of the disclosed subject matter.

It should be noted that any suitable features can be aggregated and/or averaged for determining a clip score. For example, FIG. 12 shows an illustrative process 1200 for generating a clip score for each clip. As shown in FIG. 12, process 1200 can begin by retrieving multiple extracted features at 1210. These extracted features can include, for example, the average number of tracked features, the average amount of foreground motion, the average of (1.0—area of frame that is overexposed or underexposed), the average exposure range, a fraction of sharp frames in the clip, the length of the clip, a clip type score (e.g., where static clips can be deemed preferable to linear clips), etc. These can sometime be referred to as clip features.

In some embodiments, at 1220, process 1200 can normalize the obtained clip features. For example, the mean and standard deviation can be calculated for each feature across all of the clips. For each clip feature, the clip feature can be subtracted by the mean clip feature and divided by the standard deviation of the clip feature to obtain a normalized or transformed clip feature.

In some embodiments, at 1230, a clip score for each clip can be generated by combining the normalized clip features. For example, process 1200 can determine the weighted average of the normalized clip features. It should be noted that the weights applied to each clip feature can be user-defined weights. For example, weights can be selected empirically or learned from labeled data.

Referring back to FIG. 1, in some embodiments, a transition score can be calculated between adjacent candidate clips. Generally speaking, the transition score can be used to describe how well one clip appears after the presentation of an adjacent clip within a generated video thumbnail. For example, using the transition score to select particular clips can inhibit the use of clips having two linear paths adjacent to each other, jump cuts, etc.

Figure 13:
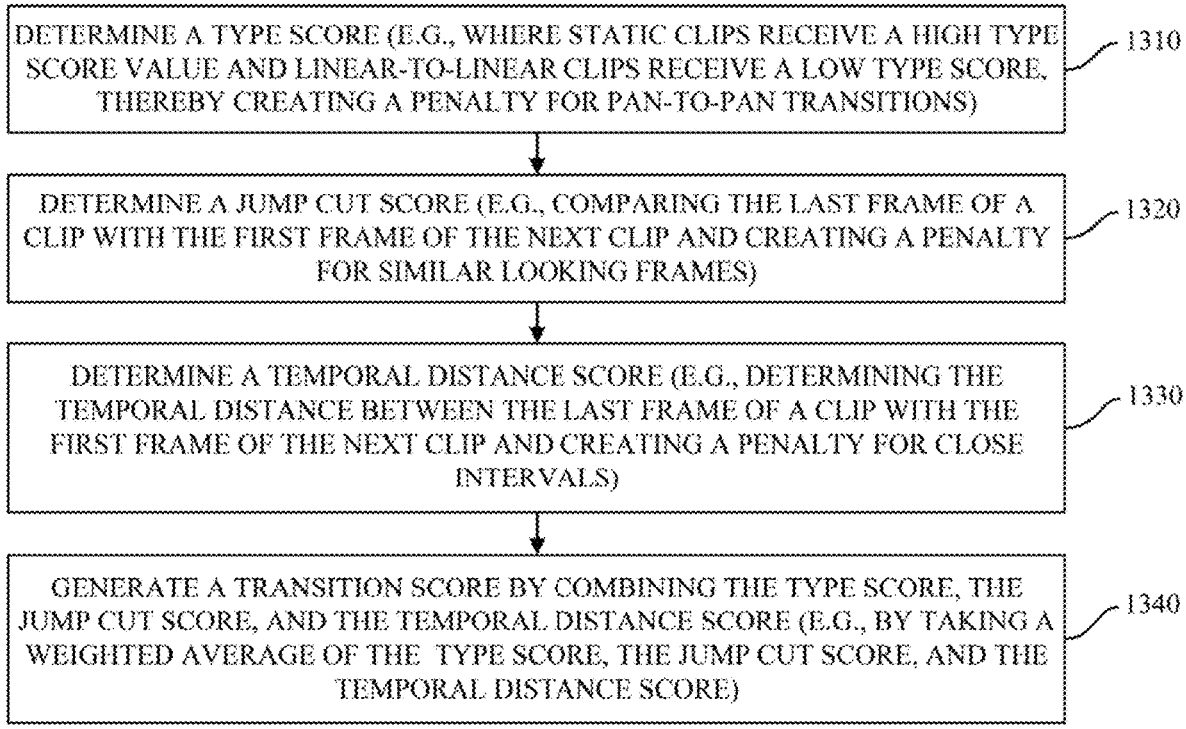
FIG. 13 shows an illustrative example of a process for generating a transition score between adjacent clips in accordance with some embodiments of the disclosed subject matter.

FIG. 13 shows an illustrative process 1300 for generating a transition score between adjacent clips. The transition score can be based on any suitable number of scores. For example, as shown in FIG. 13, the transition score can be based on a type score, a jump cut score, and a temporal distance score.

In some embodiments, at 1310, process 1300 can determine a type score between adjacent clips. For example, a high type score value can be assigned for static clips (e.g., where a high type score value is 1.0), a median type score value can be assigned for static-to-linear clips (e.g., where a median type score value is 0.8), and a low type score value can be assigned to linear-to-linear clips (e.g., where a low type score value is 0.2). The type score can, for example, create a penalty for pan-to-pan transitions.

In some embodiments, at 1320, process 1300 can determine a jump cut score between adjacent clips. For example, process 1300 can compare the last frame of a clip with the first frame of the next adjacent clip and create a penalty for similar looking frames. In a more particular example, process 1300 can determine the mean difference of the images between the last frame of a clip with the first frame of the next adjacent clip and modulate by a Gaussian weight to penalize similar looking frames.

In some embodiments, at 1330, process 1300 can determine a temporal distance score for adjacent clips. For example, process 1300 can determine the temporal distance between the last frame of a clip with the first frame of the next clip and create a penalty for close intervals. In a more particular example, process 1300 can determine the temporal distance and modulate it by a negative Gaussian weight to penalize close intervals.

Upon determining one or more scores, process 1300 can generate a transition score by combining the determined scores at 1340. For example, the transition score between two adjacent clips can be determined by calculating a weighted average of the type score, the jump cut score, and the temporal distance score. It should be noted that the weights applied to each clip feature can be user-defined weights. It should also be noted that the transition score can be determined during clip selection described herein below.

Referring back to FIG. 1, a subset of candidate clips can be selected based on the determined clip score and/or the transition score at 170. For example, a subset of M clips can be selected from N candidate clips (where N>M) such that the total sum of clip scores and transition scores is maximized.

Figure 14:
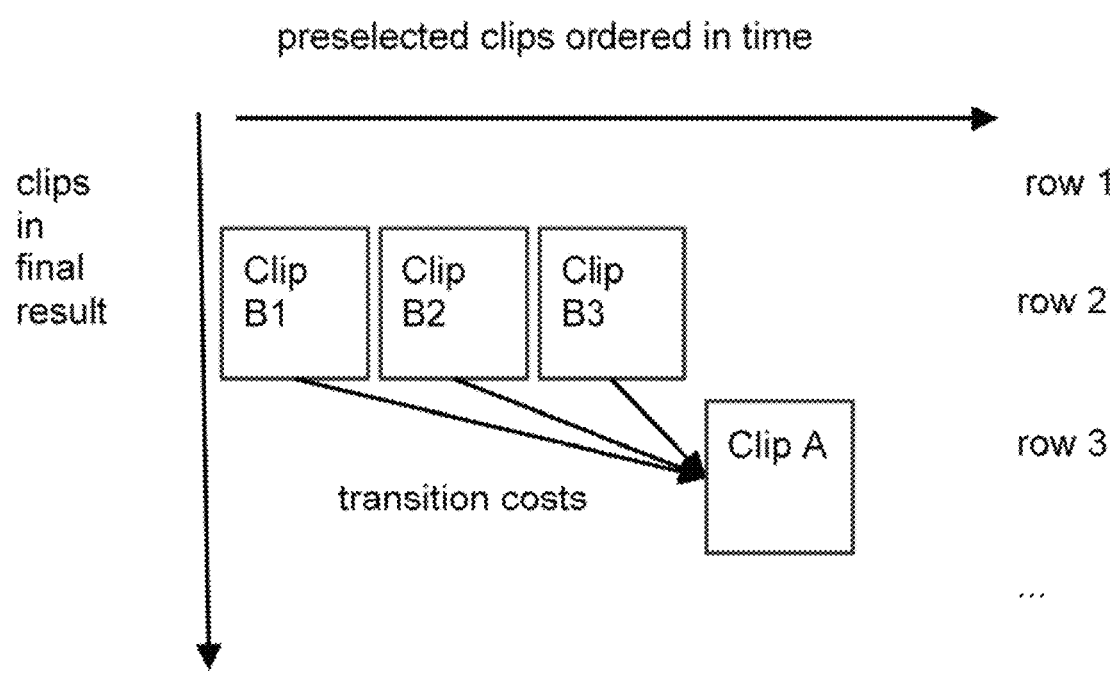
FIG. 14 shows an illustrative example of a matrix for selecting clips from a set of candidate clips in accordance with some embodiments of the disclosed subject matter.

For example, an illustrative M×N matrix of clip scores is shown in FIG. 14, where N is the number of pre-selected candidate clips and M is the number of clips for selection (e.g., seven clips). For each row i, consider a specific entry A, where the best neighbor B in the row i−1 is determined (e.g., under the constraint that the clip occurred earlier in time). More particularly, the best neighbor can be determined by the accumulated clip score of the previous neighbor B along with a transition cost of A to B. The score of A can then be updated to include transition score and the score of the best neighbor B:

$$\text{score }(A) \leftarrow \text{score}(A) + \max_j(\text{score}(B_j) + \text{transition}(A, B_j))$$

This can be performed iteratively until the last row of the M×N matrix is reached. For each clip in a row, the maximum B in the previous row that was attained can be stored. In response, the maximum in the last row and the stored best neighbor information can be used to determine which clips to select from the N candidate clips.

It should be noted that the maximum may generally be found in the last row. However, in some cases, the maximum score in the last row may be smaller than the maximum score in the row above (e.g., due to negative transition scores). Upon determining that the maximum score in the last row is significantly smaller based on a threshold percentage (e.g., 90%), the row above the last row can be selected and the determination can be performed iteratively such that at least half of the requested clips are selected.

Referring back to FIG. 1, a video thumbnail can be generated at 180, where the video thumbnail includes multiple frames selected from a selected clip. For example, process 100 can select seven clips with each having seven frames to summarize a received video. In a more particular example, as described above, the extracted thumbnails from 1160 of FIG. 11 for each of the selected clips can be decompressed or otherwise retrieved and stitched together to form a video thumbnail (e.g., an animated GIF file containing the extracted thumbnail images). In some embodiments, a stabilizing image transform can be applied such that final frames are cropped.

In some embodiments, other imaging techniques can be applied to the video thumbnail. For example, a sequence of seven frames can be generated with a transition between one or more of the frames. In a more particular example, if adjacent frames across clips are determined to be similar in appear, a cross fade can be applied as a transition between the selected frames.

It should be noted that any suitable number of clips can be selected and any suitable number of frames from each of the clips can be selected.

Figure 15A:
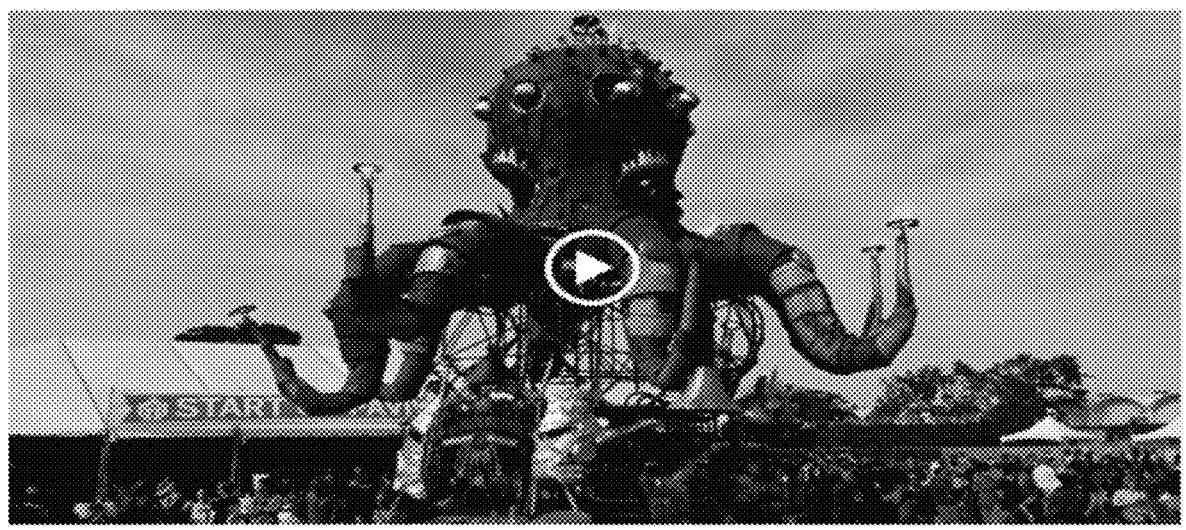
FIGS. 15A and 15B show illustrative examples of a video thumbnail presented in a video presentation application in accordance with some embodiments of the disclosed subject matter.
Figure 15B:
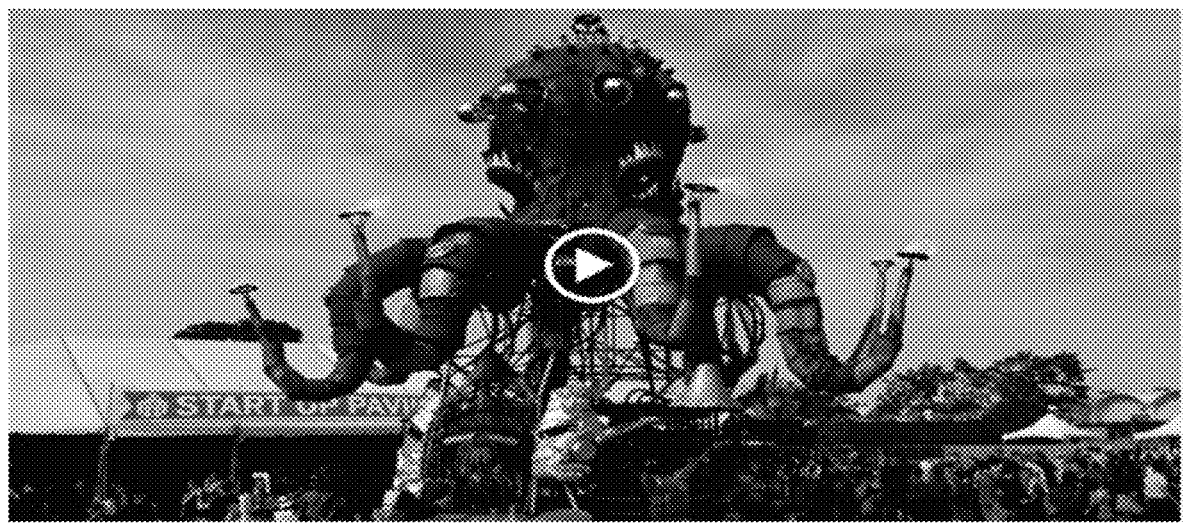

Accordingly, the video thumbnail can be associated with the received video and/or presented as a summarized version of the received video. For example, in a preview window containing a link to the received video, the video thumbnail that was generated as described herein can be presented to a viewer. Illustrative examples of a video thumbnail in accordance with some embodiments of the disclosed subject matter are shown in FIGS. 15A and 15B as part of an imaging application. It should be noted that the generated video thumbnails described herein can be used with any suitable application or service, such as a social networking service, a video sharing service, a mobile device application that presents images and/or video content, etc.

In a more particular example, the animated video thumbnails shown in FIGS. 15A and 15B can be automatically generated based on any suitable criterion.

For example, an animated video thumbnail having a lower resolution and size than its corresponding video can be generated in response to receiving a video that is greater than a particular threshold size (e.g., creating an animated video thumbnail that summarizes a video that is larger than 1 GB).

In another example, an animated video thumbnail having a lower resolution and size than its corresponding video can be generated in response to initiating a mobile device application that presents a preview of the video, where the animated video thumbnail is presented as the preview of the video. For example, on a mobile device application that has a gallery of images and/or videos, animated video thumbnails can be automatically generated for each video that is accessible by the mobile device application. In another example, on a mobile device application that presents live streaming media content, animated video thumbnails can be automatically generated at particular times to present a preview of the content in the live stream. This can, for example, increase load times for previews of large videos and facilitate the storage of animated video thumbnails on the mobile device (e.g., as opposed to entire video files).

In yet another example, an animated video thumbnail having a lower resolution and size than its corresponding video can be generated in response to access a particular service that presents videos and/or previews of videos. For example, animated video thumbnails can be presented as previews on a social media website, an online video website, a news site, a video streaming service, etc. In another example, animated video thumbnails can be presented as part of audio-visual collages or stories that summarize albums, where one or more animated video thumbnails can be presented within the story in place of an entire video or a clip of the video.

Figure 16:
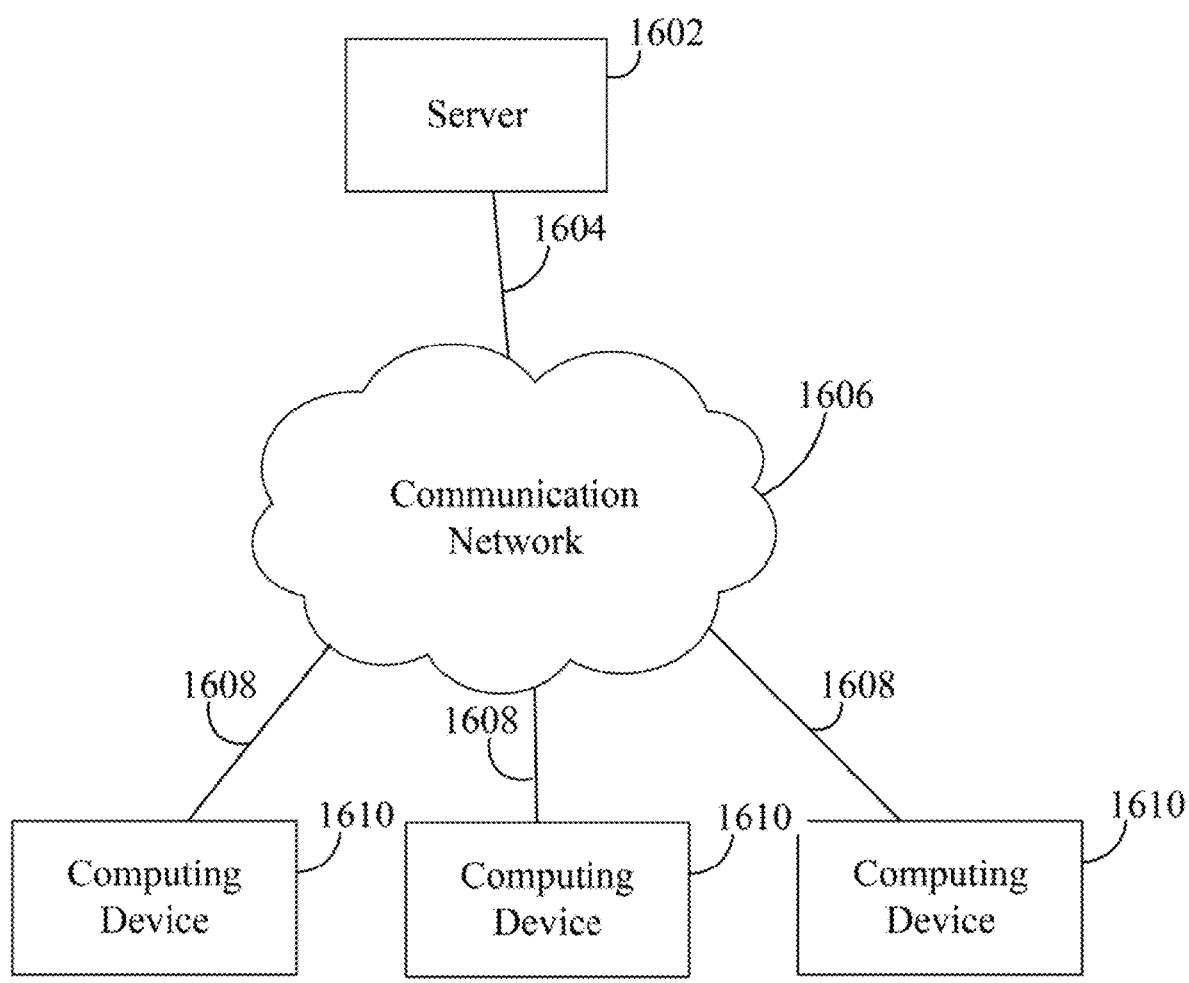
FIG. 16 shows a schematic diagram of an illustrative system suitable for implementation of the mechanisms described herein for generating a video thumbnail for a received video file in accordance with some embodiments of the disclosed subject matter.

FIG. 16 shows an example 1600 of a generalized schematic diagram of a system on which the mechanisms for generating a summarized video with video thumbnails as described herein can be implemented in accordance with some embodiments. As illustrated, system 1600 can include one or more computing devices 1610. Computing devices 1610 can be local to each other or remote from each other. Computing devices 1610 can be connected by one or more communications links 1608 to a communications network 1606 that can be linked via a communications link 1604 to server 1602.

System 1600 can include one or more servers 1602. Server 1602 can be any suitable server for providing access to the mechanisms described herein for presenting a summarized video with one or more video thumbnails, such as a processor, a computer, a data processing device, or any suitable combination of such devices. For example, the mechanisms for generating a summarized video with video thumbnails and/or presenting a summarized video with one or more video thumbnails can be distributed into multiple backend components and multiple frontend components and/or interfaces. In a more particular example, backend components, such as data collection, data distribution and video editing can be performed on one or more servers 1602. In another particular example, frontend components, such as a user interface, data entry, video rendering, etc., can be performed on one or more computing devices 1610.

In some embodiments, each of the computing devices 1610 and server 1602 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 1610 can be implemented as a smartphone having a camera, a tablet computer having a camera, a wearable computer having a camera, a camera device that interfaces with a smartphone (e.g., a camera dongle for a smartphone), a digital camera (e.g., a point and shoot camera, a DSLR camera, a digital camcorder, etc.), an analog camcorder, a personal computer, a laptop computer, a smartphone, a tablet computer, a gaming device, a media streaming device, a digital media receiver, a set-top box, a smart television, a server, etc.

Communications network 1606 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 1604 and 1608 can be any communications links suitable for communicating data among computing devices 1610 and server 1602, such as network links, dial-up links, wireless links, hard-wired links, any other suitable communications links, or any suitable combination of such links. Computing devices 1610 can upload video to server 1602. Computing device 1610 can also be used to present videos from server 1602 or from any other suitable source (e.g., a hard drive, cloud storage, a flash drive, etc.) to a viewer (e.g., using a video presentation application and/or using an application for rendering videos). Computing devices 410 and server 402 can be located at any suitable location.

Figure 17:
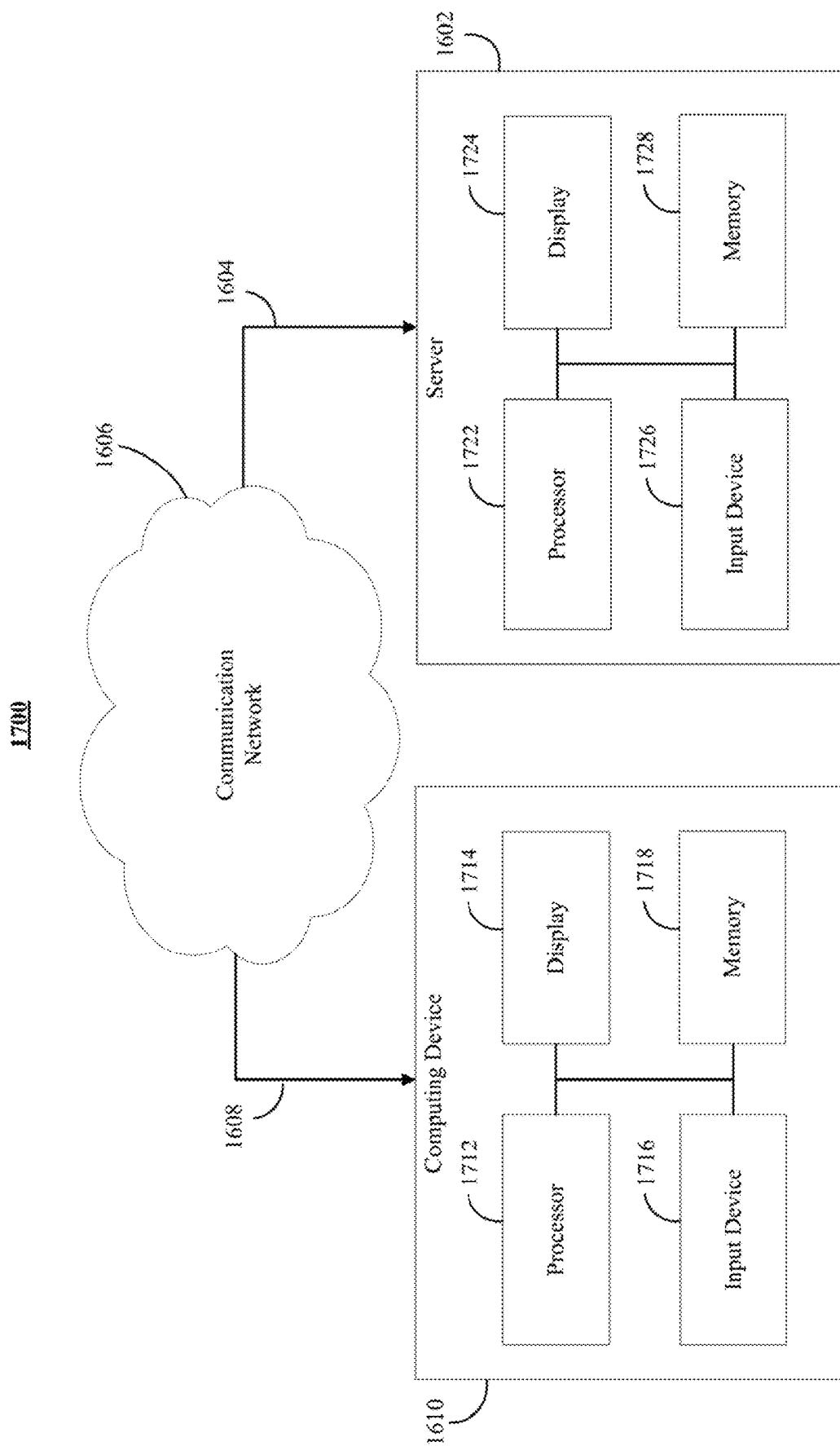
FIG. 17 shows a detailed example of a server and one of the computing devices of FIG. 16 that can be used in accordance with some embodiments of the disclosed subject matter.

FIG. 17 illustrates an example 1700 of hardware that can be used to implement server 1602 and one of computing devices 1610 depicted in FIG. 16 in accordance with some embodiments of the disclosed subject matter. Referring to FIG. 17, computing device 1610 can include a hardware processor 1712, a display 1714, an input device 1716, and memory 1718, which can be interconnected. In some embodiments, memory 1718 can include a storage device (such as a non-transitive computer-readable medium) for storing a computer program for controlling hardware processor 1712.

Hardware processor 1712 can use the computer program to present on display 1714 content and/or an interface that allows a user to, among other things, cause a video to be uploaded to server 1602, interact with the video summarizing application, interact with the video presentation application, interact with the mechanisms described herein for generating a summarized video including one or more video thumbnails a video being executed by a device, such as server 1602, and to send and receive data through communications link 1608. It should also be noted that data received through communications link 1608 or any other communications links can be received from any suitable source. In some embodiments, hardware processor 1712 can send and receive data through communications link 1608 or any other communication links using, for example, a transmitter, receiver, transmitter/receiver, transceiver, or any other suitable communication device. Display 1714 can be a flat panel display, a cathode ray tube display, a projector, a touch screen, a speaker(s), and/or any other suitable display and/or presentation devices. Input device 1716 can be a computer keyboard, a computer mouse, a microphone, a touchpad, a voice recognition circuit, a touchscreen, and/or any other suitable input device.

Server 1602 can include a hardware processor 1722, a display 1724, an input device 1726, and memory 1728, which can be interconnected. In some embodiments, memory 1728 can include a storage device for storing data received through communications link 1604 or through other links. The storage device can further include a server program for controlling hardware processor 1722.

Hardware processor 1722 can use the server program to communicate with image capture devices or computing devices 1610, as well as provide access to and/or copies of the video presentation application. It should also be noted that data received through communications link 1604 or any other communications links can be received from any suitable source. In some embodiments, hardware processor 1722 can send and receive data through communications link 1604 or any other communication links using, for example, a transmitter, receiver, transmitter/receiver, transceiver, or any other suitable communication device. In some embodiments, hardware processor 1722 can receive commands and/or values transmitted by one or more users. Display 1724 can be a flat panel display, a cathode ray tube display, a projector, a touch screen, a speaker(s), and/or any other suitable display and/or presentation devices. Input device 1726 can be a computer keyboard, a computer mouse, a microphone, a touchpad, a voice recognition circuit, a touchscreen, and/or any other suitable input device.

In some embodiments, server 1602 can be implemented in one server or can be distributed as any suitable number of servers. For example, multiple servers 1602 can be implemented in various locations to increase reliability and/or increase the speed at which the server can communicate with computing devices 1610. As another example, multiple servers 1602 can be implemented for performing various tasks, such as one server (or set of servers) can receive videos (e.g., video files), another server (or set of servers) stores features or input information associated with each video, another server (or set of servers) selects and/or stores candidate clips from each video, another server (or set of servers) generates a video thumbnail for each video, and yet another server (or set of servers) can provide access to the video presentation application and cause videos or associated video thumbnails to be presented to viewers in response to a request to present a video.

In one particular embodiment, the mechanisms described herein can include server-side software, server-side hardware, client-side software, client-side hardware, or any suitable combination thereof. For example, the editing application and/or the video presentation application can encompass a computer program written in a programming language recognizable by server 402 executing the editing application (e.g., a program written in a programming language, such as, Java, C, Objective-C, C++, C#, Javascript, Visual Basic, or any other suitable approaches). As another example, the editing application and/or the video presentation application can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

Accordingly, methods, systems, and media for generating a summarized video with one or more video thumbnails are provided.

In some embodiments, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1 and 3 can be executed or performed in any order or sequence not limited to the order and sequence shown and described in the figures. Also, some of the above steps of the processes of FIGS. 1, 11, 12, and 13 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for summarizing videos, the method comprising:
   receiving, using a hardware processor, a plurality of image content;
   extracting, for each of the plurality of image content, a plurality of features;
   generating a plurality of candidate content that each includes a portion of the plurality of image content based on the extracted plurality of features indicating that the portion of the plurality of image content includes interesting content;
   selecting first candidate content and second candidate content that are adjacent candidate content based on a transition between the adjacent candidate content, wherein transitions between the adjacent candidate content are penalized for containing particular features; and
   automatically generating an animated video thumbnail that includes the first candidate content and the second candidate content.

2. The method of claim 1, wherein the plurality of image content includes a video content item comprising a plurality of video frames.

3. The method of claim 2, wherein each of the plurality of video frames is associated with a number of tracked features in each frame of the plurality of video frames.

4. The method of claim 2, wherein each of the plurality of video frames is associated with tracked features that estimate a motion path of a camera device between video frames.

5. The method of claim 4, wherein one or more of the tracked features is associated with an object appearing in a video frame.

6. The method of claim 2, further comprising determining foreground features and background features in each of the plurality of candidate content, wherein information associated with the foreground features in comparison with information associated with the background features is used to determine whether the portion of the plurality of frames includes interesting content.

7. The method of claim 6, further comprising iteratively determining one or more ellipses around the foreground features in each video frame based on a mean shift clustering.

8. The method of claim 2, wherein each of the plurality of video frames of the video content item is associated with tone statistical information that describes a number of pixels with a video frame that are overexposed or underexposed and an exposure range of the video frame.

9. The method of claim 2, wherein each of the plurality of video frames of the video content item includes a blur score and wherein the method further comprises identifying video frames within the video content item for removal from use for candidate content based on the blur score.

10. The method of claim 2, further comprising:
calculating, for each of the plurality of candidate content, a clip score based on the extracted plurality of features from the video frames associated with each candidate content.

11. The method of claim 10, wherein the clip score for each candidate content is calculated by normalizing each feature of the extracted plurality of features from the video frames associated with each candidate content and combining the normalized plurality of features, wherein each of the normalized plurality of features is assigned a weight.

12. The method of claim 11, wherein each of the extracted plurality of features is aggregated and averaged over an interval of frames associated with each candidate content.

13. The method of claim 10, further comprising:
calculating, between the adjacent candidate content of the plurality of candidate content, a transition score for the transition based at least in part on a comparison of video frame features between frames from the adjacent candidate content, wherein the transition score includes a penalty for containing similar looking frames, and wherein the first candidate content and the second candidate content are selected based at least in part on the clip score and the transition score associated with each of the candidate content.

14. The method of claim 13, wherein the transition score for the transition between adjacent candidate content is calculated by determining a type score, a jump cut score, and a temporal distance score and combining the type score, the jump cut score, and the temporal distance score, wherein each of the type score, the jump cut score, and the temporal distance score is assigned a corresponding weight.

15. The method of claim 2, further comprising:
determining a stabilized camera path; and
determining a warp distance between frames for the stabilized camera path, wherein the plurality of candidate content are generated based on the warp distance.

16. The method of claim 15, further comprising:
creating a video segment based on a variation score; and
determining whether to add a specific frame to the video segment based on the variation score across an interval including the video segment and the specific frame, wherein candidate content can be generated in which the specific frame is added to the video segment in response to the variation score across the interval including the video segment and the specific frame exceeding a threshold value for the variation score.

17. The method of claim 14, further comprising:
calculating a total variation score for each of a plurality of video segments;
ranking the video segments based on the total variation scores; and
combining adjacent video segments from the ranked video segments based on the total variation scores, wherein the plurality of candidate content are generated based on the combined adjacent video segments.

18. The method of claim 2, further comprising:
extracting the plurality of video frames from each of the first candidate content and the second candidate content in response to generating the plurality of candidate content; and removing the video content item from memory in response to extracting the plurality of video frames from each of the plurality of candidate content.

19. The method of claim 2, further comprising:
determining an estimation of an original motion path of a camera device that recorded the video content item;
selecting a crop window having a window size less than a size of a video frame of the video content item; and
determining a crop window transform to transform the original motion path of the camera device to a modified motion camera path, wherein the crop window associated with the crop window transform is constrained to the window size.

20. A system for summarizing a video, the system comprising:
a hardware processor that is configured to:
receive a plurality of image content;
extract, for each of the plurality of image content, a plurality of features;
generate a plurality of candidate content that each includes a portion of the plurality of image content based on the extracted plurality of features indicating that the portion of the plurality of image content includes interesting content;
select first candidate content and second candidate content that are adjacent candidate content based on a transition between the adjacent candidate content, wherein transitions between the adjacent candidate content are penalized for containing particular features; and
automatically generate an animated video thumbnail that includes the first candidate content and the second candidate content.

21. A non-transitory computer-readable medium containing computer executable instructions that, when executed by a processor, cause the processor to perform a method for summarizing a video, the method comprising:
receiving a plurality of image content;
extracting, for each of the plurality of image content, a plurality of features;
generating a plurality of candidate content that each includes a portion of the plurality of image content based on the extracted plurality of features indicating that the portion of the plurality of image content includes interesting content;
selecting first candidate content and second candidate content that are adjacent candidate content based on a transition between the adjacent candidate content, wherein transitions between the adjacent candidate content are penalized for containing particular features; and
automatically generating an animated video thumbnail that includes the first candidate content and the second candidate content.

* * * * *